ature Patent [19]

United States Patent [19]
Knudsen, Jr.

[11] 3,859,264
[45] Jan. 7, 1975

[54] DIRECT STABILIZATION OF SULFONATED POLYMERS

[75] Inventor: George A. Knudsen, Jr., Scotch Plains, N.J.

[73] Assignee: Esso Research and Engineering Company, Linden, N.J.

[22] Filed: Sept. 2, 1970

[21] Appl. No.: 69,137

[52] U.S. Cl.. 260/45.85 R, 260/45.7 R, 260/79.3 R
[51] Int. Cl.......................... C08f 45/56, C08f 45/62
[58] Field of Search..... 260/79.3 R, 93.5 A, 45.7 R, 260/45.85 R

[56] References Cited
UNITED STATES PATENTS

| 2,283,236 | 5/1942 | Soday | 260/79.3 |
|---|---|---|---|
| 2,394,761 | 2/1946 | Ford | 260/79.3 |
| 2,640,820 | 6/1953 | Teot et al. | 260/79.3 |
| 2,663,700 | 12/1953 | Roth et al. | 260/79.3 |
| 3,218,301 | 11/1965 | Moody et al. | 260/79.3 |
| 3,432,480 | 3/1969 | Stratton | 260/79.3 |

Primary Examiner—Melvyn I. Marquis
Assistant Examiner—R. A. White

[57] ABSTRACT

The acid form of any water-dispersible resin sulfonate can be stabilized by mixing into the reaction product slurry obtained by sulfonation of the polymer in dichloroethane or a similar liquid media a measured amount of a powdered base which, along with the sulfonated polymer, is insoluble in the liquid media. The insoluble acid-base mixture is thereafter filtered off and air dried. This method avoids the necessity of forming the neutralized sulfonic acid salt while affording a stable solid.

8 Claims, No Drawings

DIRECT STABILIZATION OF SULFONATED POLYMERS

THE BACKGROUND OF THE INVENTION

Water-dispersible resin sulfonates such as sulfonated polystyrene can be prepared comparatively easily by reacting the resin with a sulfur trioxide complex under substantially anhydrous conditions in a chlorinated solvent such as methylene chloride or dichloroethane. Since the acid particles or granules are insoluble in media such as chlorinated aliphatic hydrocarbons, the resultant product is a slurry. Various methods have been developed to isolate the acid, the most convenient probably being to filter off the acid and heat or air dry to obtain a solid product. However, the acid forms of these sulfonated polymers have been reported to be thermally unstable and to undergo marked degradation at room temperature even when stored as a dried solid (see, e.g., W. R. Carrol and H. Eisenberg, J. Polymer Science, (A-2), 4, 599 (1966)). Aqueous solutions of the acid undergo a substantial change in viscosity after standing for 24 hours at room temperature. Further, elevated temperatures and catalysis by mineral acids such as sulfuric acid contribute to the polymer's degradation. Because of these undesirable characteristics, the acid form has been considered to have little commerical value. Therefore, the acid is generally converted to the form of a finely-divided substantially water-free alkali or alkaline earth metal salt which exhibits much higher stability.

Difficulties are invariably encountered in attempting to convert the acid to the salt form. Numerous techniques have been attempted to achieve the neutralized product. Among them are the following general approaches:

The crude sulfonated polymer in acid form, after having been dried, is dissolved in a large volume of water and the solution neutralized by treatment with an alkali such as sodium or potassium hydroxide. The resulting solution is then heated to evaporate the water. In such a case, a massive product is generally obtained which must be broken up prior to use. Another method involves the addition of the resin sulfonic acid to a methanol-water solution of sodium hydroxide. The resultant sodium salt is then filtered and subsequently vacuum dried. A third technique avoids isolation of the acid by feeding the reaction product slurry of the resin sulfonic acid directly into a flashing zone containing both liquid and vaporous water at sufficiently high temperature so that the reaction medium is in a vapor state. A vapor stream of water and the reaction medium is then withdrawn leaving an aqueous dispersion of the sulfonated polymer. Thereafter, the dispersion is pumped to a neutralizer containing a solution of sodium hydroxide; the resultant salt is subsequently withdrawn to a drum drier to evaporate the water. Similar techniques involve processes such as steam distillation and the spray drying of dilute aqueous solutions of the salt. All of these approaches are inconvenient, time-consuming, involve considerable amounts of equipment, and add substantially to cost of the final product.

THE PRESENT INVENTION

It has now been unexpectedly discovered that the acid form of freshly prepared sulfonated polymers such as polystyrene can be stabilized by mixing controlled amounts of an insoluble powdered base such as sodium hydroxide directly in the slurry of the resin sulfonic acid and the original liquid suspending medium. The resultant acid-base mixture can thereafter be isolated by a simple filtration followed by air drying. By using this novel technique it is possible to avoid the elaborate neutralization processes employed in the prior art. Further, it has been determined that the dried solid which is the final product of this invention is an acid-base mixture wherein the sulfonated polymer is substantially in the unneutralized acid form.

The resin sulfonic acid slurry is normally prepared in the following manner. Approximately one-fourth of the reaction vessel is first filled with the composition, normally a halogenated aliphatic hydrocarbon, to be used as the liquid medium for the reaction. To this liquid is added triethylphosphate (TEP) in quantities to be discussed below. Sulfur trioxide in sufficient amounts to form a 1:1 complex with the TEP is next added to the reaction vessel. The sulfur trioxide may be in any form but, for convenience, is used herein in its liquid state. A previously prepared solution of the polymer in the liquid medium of choice, in concentrations to be discussed below, is then added to the reaction vessel, simultaneously with additional sulfur trioxide, in such manner that at no time does the molar ratio of polymer and the additional sulfur trioxide vary much more than 1:1.

To assure uniform sulfonation of the polymer, mixing is continued throughout the course of the reaction. Further, the reaction is run in an inert atmosphere, e.g., under $N_2$ gas. All materials used are preferably in an anhydrous condition in order to avoid the undesirable side reaction of sulfur trioxide with water. The presence of sulfuric acid in the reaction mixture promotes the formation of a curdy precipitate in contrast to the very fine solid particles which are obtained when anhydrous conditions are employed. The formation of a curdy precipitate hampers the stabilization procedure. The reaction temperature is not particularly critical but it is preferred, for convenience, to maintain room temperature throughout the course of the reaction.

The novel stabilization techniques employed in the instant invention are applicable to any water-dispersible polymers containing acidic moieties, which moieties it was heretofore necessary to neutralize in order to avoid deleterious side reactions. The most common of these are the water-dispersible resin sulfonates such as sulfonated polystyrene-type homo- and copolymers. Thus, while the sulfonated polymers employable herein should contain a substantial number of alkenyl aromatic units, it is not necessary that they be homopolymers. Various sulfonated co- and terpolymers containing up to 50 to 90% of a nonaromatic monomer unit may also be utilized in this process. For instance, copolymers of from 70 to 98% styrene and from 30 to 2% acrylonitrile may be used. Other suitable copolymers include copolymers of from 65 to 98% vinyl toluene and from 35 to 2% acrylonitrile, copolymers of styrene, vinyl toluene and from 2 to 35% acrylonitrile, copolymers of from 60 to 75% alphamethyl styrene, 20 to 25% acrylonitrile and 5 to 10% ethyl methacrylate, copolymers of styrene and sulfur dioxide, copolymers of from 68 to 95% of either or both of the compounds styrene and vinyl toluene and from 13 to 40% of ethyl methacrylate, the copolymer of 75% styrene and 25% ethyl acrylate, copolymers of 5 to 30% styrene and 70 to 95% butadiene-1,3, copolymers of 75 to 98% styrene and 25 to 2% isobutylene, etc.

Since water-dispersibility of these polymers is largely dependent on sulfonation levels, at least 25%, preferably 60%, and where possible, most preferably 100%, of the total monomer units per polymer chain should be sulfonated.

The average molecular weight of polymers useful in this process may vary in the range of about 500 to over 12,000,000. The polymer when added to the reaction vessel is generally dissolved in a solution of the halogenated aliphatic hydrocarbon. Concentrations may vary from about 1 to about 100 wt. %, depending upon molecular weight of the polymer. For the higher molecular weights, i.e., greater than 1,000,000, the lower range (i.e., 1 to 10 wt. %) will preferably be employed; for molecular weights in the range of about 100,000 to about 1,000,000, the preferable range will be from 5 to as high as 30 wt. %. For molecular weights in the range of about 500 to about 100,000, the concentrations may vary from 100% (i.e., polymer neat) for the liquid polymers to about 10% depending upon mixing equipment available and solution viscosity obtained.

The amount of TEP used in the reaction is dependent upon the ultimate amount of polymer added. The molar ratio of polymer (measured in monomer units) to TEP may vary from about 1:1 to about 20:1. Again, the preferable ratios will be determined by the molecular weight of the polymer. For medium molecular weights it has been found that quite satisfactory results are obtainable using ratios of from 15 to 20:1. Therefore, for economic reasons, this range will be preferable. For the higher molecular weights, best results have been obtained at lower ratios, i.e., about 1:1 to about 5:1.

The reaction medium employed must be a liquid which will dissolve the unsulfonated polymer and the sulfur trioxide-phosphorus complex and be unreactive with the complex. Suitable media include dichloroethane, carbon tetrachloride, chloroform, methylene chloride and other inert halogen-containing hydrocarbon compounds. Other nonhalogen-containing compounds which meet the above criteria may also be used. Preferably the reaction medium is dichloroethane.

While the above procedure for preparation of the reaction product slurry is the one preferably used in the present invention, it must be noted that any similar method for producing a slurry of the resin sulfonic acid in a nonreactive suspending medium may be employed. For example, as an alternative to the use of TEP as complexing agent, any of the known complexing agents of the prior art may be used. These complexing agents include β-dichloroethyl ether, dioxane, carboxylic acids, sulfonic acids, amides such as dimethyl formamide, etc.

After the slurry has been prepared, the powdered base which, along with the resin sulfonic acid, is also insoluble in the liquid suspending medium, is added in controlled amounts. (When using very low molecular weight polymers, e.g., 500 to about 50,000 it is sometimes desirable after sulfonation to add trace amounts of water to complex with the polymer and assure the insolubility of the sulfonated polymer in the suspending medium.) The stability of the mixture (final product) will vary depending on the amount of base added (Table I). Stability equivalent to direct neutralization is obtained by adding an amount of base at least equal to the following: 1 equivalent of base for every equivalent of sulfonic acid present in the polymer added plus sufficient additional amounts of base to neutralize the remaining $SO_3$:TEP complex, i.e., approximately 2 equivalents of base per mole of TEP. Preferably, a 10–15 mol. % excess of base is added. Although it is not necessary, it is preferable to mix the slurry for several hours (e.g., 5 to 10 hrs.) after addition of base to assure thorough mixing.

The base selected may be any base capable of being obtained in powdered form so long as the base is insoluble in the reaction medium. Examples include, but are not limited to, alkali and alkaline earth metal hydroxides, carbonates, acetates, etc. Preferably the base will be selected from the group consisting of $Na_2CO_3·H_2O$, $NaOH$, $KOH$, $Li_2CO_3$, $Na_2CO_3$, $NaHCO_3$, $Ca(OH)_2$, etc.

After the base has been added to the reaction product slurry and mixed for the desired amount of time, the sulfonic acid-base mixture may be readily separated from the reaction product slurry, e.g., by simple filtration, by centrifuging, etc. The precipitate may then be dried by any convenient means (e.g., air, vacuum or heat drying) to obtain the finely-divided white solid of the instant invention.

It has been determined that the product obtained is not the neutralized metal salt of sulfonated polystyrene, but rather is an intimate admixture of the powdered base and the resin sulfonic acid in its substantially unneutralized form. A simple test to determine the above result may be made by sprinkling a small amount of the solid product on moist pH paper. Characteristic colors are formed indicating small particles of both acid and base are present.

By using the amounts of base set forth above, the final solid product will exhibit a pH in the range of about 6 to about 9 when dissolved in water. It appears clear that the dissolved acid-base mixture undergoes a neutralization reaction at this point. It is possible then to store the stable acid-base mixture in solid form for extended periods of time and, at a later date, readily convert the mixture to the neutralized salt form if desired for commercial use.

If insufficient amounts of base are added to the reaction product slurry, the resulting product will nevertheless be appreciably more stable than the completely unmodified acid form. It has been determined that even for pH levels as low as about 2.5 (pH of pure acid equals approximately 1.5 for sulfonated polystyrene), sufficient stability is obtained for some commercial purposes. However, it is preferable to add sufficient base to maintain pH levels close to those of the neutral salt (i.e., 6–9).

It is well known in the art that by measuring the change in viscosity of a polymer solution over a period of time it is possible to determine the degree of degradation of that polymer. Therefore, aqueous solutions of various acid-base mixtures used in the present invention were prepared by the above-described techniques and their viscosities were measured. Dry samples of the same mixture used in making the aqueous solution were then heat-aged at high temperatures for extended periods of time. Thereafter, aqueous solutions of these heat-aged polymer mixtures were prepared and again viscosities were measured. Change in the viscosities of the solutions as a result of this heat-aging were used as a measure of the thermal stability of the mixture. In cases where sufficient salt had been added so that the pH of the aqueous solution was in the range of 6–9, the thermal stabilities of the mixture were comparable to those of the neutralized salts of the prior art. On the other hand, when no base was added to the reactor, heat-aging of the isolated acid showed marked changes in viscosity, supporting the conclusion that degradation had occurred.

Further, the isolated acid, with no base added, underwent a color change from off-white to dark brown on heat-aging. This color change is also an indication that degradation of the polymer has occurred. In contrast to the pure isolated acid, both the neutralized salt of the prior art and the solid acid-base mixture of the instant invention showed no visible change in color on heat-aging.

When sulfonated resins were prepared using β-dichloroethyl ether as complexing agent rather than TEP, the unstabilized sulfonic acid changed to an intractable, darkbrown tar on heat-aging. However, because of the different complexing abilities of β-dichloroethyl ether with $SO_3$, it is believed that both degradation and considerable cross-linking occurred. Thus, the viscosity changes which occurred when using TEP could not be noted. When stabilized by the novel process of the instant invention, these sulfonated resins did, however, produce a fine white powder identical to that produced by the stabilized resin prepared using TEP complex.

An alternative method was considered in which the polystyrene sulfonic acid was originally isolated in dry form and subsequently mechanically mixed with a powdered base. The products obtained in this variation were generally unsatisfactory and comparable in their physical properties to that of the pure isolated acid. While these results are not completely understood at this time, it appears that addition of the powdered base to the reaction product slurry neutralizes contaminants such as trace amounts of sulfuric acid, excess $SO_3$:TEP complex, etc., which are soluble in the reaction medium and are believed to contribute greatly to the degradation of the acid form of sulfonated polystyrene. If the acid is isolated and dried prior to mixing with the base, these contaminants are probably adsorbed on or occluded within the polymer and no longer readily subject to attack by the base.

The products obtained by the novel processes of this invention have many commerical applications including flocculation of waste water, electroconductive polymers in paper coating, additives for oil well cement and drilling muds.

This invention may be illustrated by, but is not limited to, the following examples.

Results for Examples 1–15 are set forth in Table I below. Examples 1 and 2 of the table involve the unstabilized acid. Heat-aging of these samples causes their color to change from off-white to dark brown. This information, along with the marked change in viscosity shown in the table supports the conclusion that degradation of the isolated acid has occurred.

Examples 3–7 of Table I show the effect of slurrying the freshly prepared acid with several bases such that when an aqueous solution of the isolated material was prepared the pH of the solution was in the range of 6–9. Following heat-aging of each of these samples, no change in color was noted; the mixture remained as a white powder. Viscosities of solutions of the mixture before and after heat-aging the solid remained essentially unchanged.

Examples 8–12 of the table show that some degradation of the mixture did occur if insufficient base was used, as evidenced by aqueous solutions of the mixtures which had a pH in the range of about 2–3.

Examples 13 and 14 of the table show that stabilization was not achieved when the acid was first isolated and dried and subsequently mechanically mixed with the base.

Example 15 involves comparative data obtained for the conventional neutralized sulfonated polystyrene of the prior art. Just as for the stabilized product of the instant invention, the neutralized salt remained a white powder after heating and showed essentially no change in viscosity before and after heat aging.

TABLE I

THE EFFECT OF VARIOUS BASES IN STABILIZING SULFONATED POLYSTYRENE

| | Base (a) | Treating Method (b) | pH of Aqueous Solution Prior to Heat Aging Solid (c) | Viscosity (cps) of Solution Prior to Heat Aging Solid (d) | pH of Aqueous Solution after Heat Aging Solid | Viscosity (cps) of Solution After Heat Aging Solid |
|---|---|---|---|---|---|---|
| 1. | None | — | 1.5 | 38.6 | 1.45 | 26.3 |
| 2. | None | — | — | 30.1 | — | 15.8 |
| 3. | Sodium Carbonate Monohydrate | Method A | 6.15 | 35.9 | 6.50 | 35.1 |
| 4. | Sodium Carbonate Monohydrate | do. | 7.50 | 25.9 | 6.90 | 25.7 |
| 5. | Sodium Carbonate (Anhydrous) | do. | 7.35 | 22.1 | 7.15 | 22.5 |
| 6. | Sodium Hydroxide | do. | 9.10 | 20.6 | 8.65 | 20.5 |
| 7. | Sodium Bicarbonate | do. | 5.84 | 24.3 | 5.40 | 23.2 |
| 8. | Sodium Hydroxide | do. | 3.20 | 27.2 | — | 25.5 |
| 9. | Sodium Carbonate (Anhydrous) | do. | 2.65 | 31.4 | — | 25.6 |
| 10. | Sodium Bicarbonate | do. | 2.80 | 25.5 | 2.65 | 21.9 |
| 11. | Lithium Carbonate | do. | 2.90 | 33.2 | 2.65 | 27.1 |
| 12. | Calcium Hydroxide | do. | 2.35 | 8.6 | 2.25 | 8.1 |
| 13. | Sodium Hydroxide | Method B | — | 20.7 | — | 14.4 |
| 14. | Sodium Carbonate | do. | — | 20.7 | — | 11.0 |
| 15. | Conventional Neutralization | — | 6.3 | 13.7 | 6.1 | 13.8 |

(a) Reagent grade. The base must be in the state of a finely divided powder.
(b) Method A involves treating a dichloroethane slurry of the sulfonated polystyrene which is present in a reactor following sulfonation of polystyrene with the desired powdered base. Method B consists of mixing the isolated acid in a dry form with a powdered base in a Waring Blender.
(c) Dried solids heat aged at 160°F. for 24 hours.
(d) Viscosities were measured on a Brookfield Viscometer LVT at 25°C. using spindle number 1 at 60 RPM. 2% (wt.) solutions of the stabilized material were used.

EXAMPLE 16

Styrene-Isobutylene Copolymer

Sulfur trioxide (2.4 g., 0.03 mole) was added to a stirred reactor containing a small amount of triethyl phosphate (4.2 g., 0.023 mole) in 1,2-dichloroethane (500 ml.). The amount of sulfur trioxide added was sufficient to convert the small amount of water present in the solvent to sulfuric acid and to form a 1:1 complex with triethyl phosphate. The reactor temperature was maintained at approximately 25°C.

A solution of a copolymer of styrene (90%) and isobutylene (10%) in dichloroethane was prepared (36 g. in 76.4 g.). The sulfonation of the polymer was accomplished by adding a small portion of sulfur trioxide (1 ml.) to the reactor followed by the addition of 45 ml. of polymer solution. The sulfonated polymer precipitated as a fine white solid. The sequence of additions was repeated until all of the polymer solution had been added. Half of the reaction mixture was filtered and the sulfonate was air dried. Sodium carbonate monohydrate (15.1 g.) was added to the remaining slurry which was stirred for 30 minutes and subsequently filtered and air dried.

The stabilized and nonstabilized acid samples were heat-aged at 160°F. for 24 hours. The nonstabilized sulfonate formed a gummy crust and turned dark brown while the stabilized sample remained as a white powder.

While the above examples adequately illustrate the invention, it should be understood that the present invention in its broadest aspects is not necessarily limited to the specific materials, conditions and procedures shown therein. The present invention is limited only by the claims which follow.

What is claimed is:

1. A method for stabilizing water-dispersible resin sulfonates which comprises the steps of:
   a. preparing a slurry of the resin sulfonic acid in a nonreactive suspending medium;
   b. adding to said slurry a powdered base, said base being insoluble in the suspending medium;
   c. separating the resulting insoluble mixture of said acid and base from the suspending medium;
   and d. drying the acid-base mixture obtained from step (c).

2. The method of claim 1 wherein sufficient base is added so that when the solid mixture obtained from step (d) is dissolved in water the pH level of the resulting solution is in the range of about 6 to about 9.

3. The method of claim 1 wherein the nonreactive liquid suspending medium is a chlorinated aliphatic hydrocarbon.

4. The method of claim 1 wherein the water-dispersible resin sulfonate is sulfonated polystyrene.

5. The method of claim 1 wherein the solid mixture obtained from step (c) is air dried.

6. The method of claim 1 wherein the insoluble powdered base is selected from the group consisting of alkali and alkaline earth metal hydroxides, carbonates, and acetates.

7. A composition of matter prepared by the method of claim 1.

8. The composition of claim 7 wherein the water-dispersible resin sulfonate to be stabilized is sulfonated polystyrene.

* * * * *